United States Patent [19]

Kinoshita

[11] 4,435,998

[45] Mar. 13, 1984

[54] ROLLER TYPE PLANETARY GEAR HAVING A PRELOADING ARRANGEMENT

[75] Inventor: Keijiro Kinoshita, Yokohama, Japan

[73] Assignee: Nissan Motor Co., Ltd., Yokohama, Japan

[21] Appl. No.: 242,279

[22] Filed: Mar. 10, 1981

[30] Foreign Application Priority Data

Apr. 7, 1980 [JP] Japan .................. 55-44588

[51] Int. Cl.³ ............................................. F16H 13/06
[52] U.S. Cl. ........................................ 74/798; 74/206; 74/772
[58] Field of Search ................. 74/789, 755, 772, 798, 74/191, 792, 204, 206

[56] References Cited

U.S. PATENT DOCUMENTS 2,973,671  3/1961  Elkins .............................. 74/798 X
3,433,099  3/1969  Nasvytis ............................ 74/798

FOREIGN PATENT DOCUMENTS 908549  4/1946  France .

237353  7/1925  United Kingdom .
235562  11/1925  United Kingdom .
337651  11/1930  United Kingdom .
493152  10/1938  United Kingdom .
1175299  5/1967  United Kingdom .
1341665  12/1973  United Kingdom .
1465838  3/1977  United Kingdom .

Primary Examiner—Leslie A. Braun
Assistant Examiner—Frank H. McKenzie, Jr.
Attorney, Agent, or Firm—Thompson, Birch, Gauthier & Samuels

[57] ABSTRACT

A ring roller is mounted on an input shaft by a left-hand thread so that when the shaft is rotated in the clockwise direction the sun roller tends to unscrew along the shaft. The sun roller thus drives planet rollers axially along the shafts on which they are rotatably supported into a ring roller which is mounted on an output shaft by a left-hand thread so that it tends, upon being driven in a counter-clockwise direction by the planet rollers, to screw onto the output shaft. The axial movement of the sun roller ceases upon a suitable preloading between the sun, planet and ring rollers' being established.

7 Claims, 4 Drawing Figures

ROLLER TYPE PLANETARY GEAR HAVING A PRELOADING ARRANGEMENT

BACKGROUND OF THE INVENTION

1. Field of the Invention

The present invention relates generally to a planetary gearing and more particularly to planetary gearing which uses rollers and which has a simple and automatic preloading mechanism for biasing the rolling surfaces into slip-free contact with one another.

2. Description of the Prior Art

In a known arrangement (such as shown in FIGS. 1 and 2) planetary gearing has utilized spur type sun, planet, and ring gears. However, this arrangement has suffered from the drawbacks that noise and vibration are generated during operation.

SUMMARY OF THE INVENTION

The present invention features a planetary gearing which utilizes roller type sun, planet and ring elements and a unique preloading arrangement which is both simple and automatic. The preloading mechanism takes the form of threads which serve to mount the sun and ring elements on corresponding shafts so that upon rotation of the drive shaft, the input element (one of the ring or sun elements) tends to unscrew off the end of the input shaft, thus moving the input element in the direction of the output element (viz., the corresponding sun or ring element). This unscrewing phenomenon tends to drive the input element into firm engagement with the planet rollers, and in turn biases the planet rollers into firm contact with the output element, accordingly establishing an adequate drive connection between the rollers. The unscrewing phenomenon ceases upon an equilibrium being established between the force tending to unscrew the input element and the reaction force which accordingly results from the movement of the input element toward the output element.

BRIEF DESCRIPTION OF THE DRAWINGS

The features and advantages of the arrangement of the present invention will become more clearly appreciated from the following description taken in conjunction with the accompanying drawings in which like reference numerals denote corresponding elements, and in which.

DETAILED DESCRIPTION OF THE PREFERRED EMBODIMENT

Figure 1:
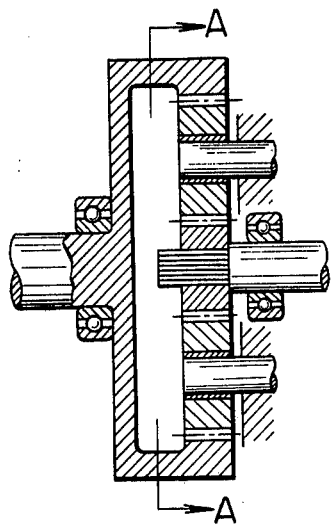
FIG. 1 is a sectional elevation of a prior art planetary gearing unit such as previously described under the heading of "Description of the Prior Art"
Figure 2:
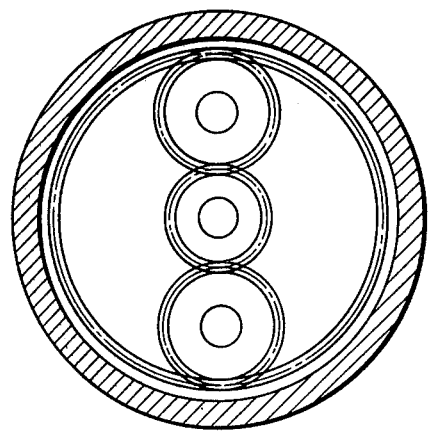
FIG. 2 is a sectional view taken along the section line A—A of FIG. 1.
Figure 3:
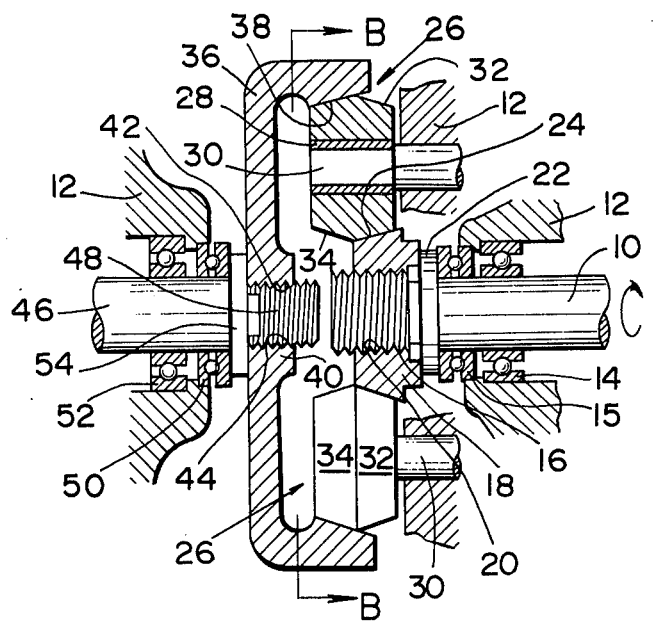
FIG. 3 is sectional elevation of a preferred embodiment of the present invention.
Figure 4:
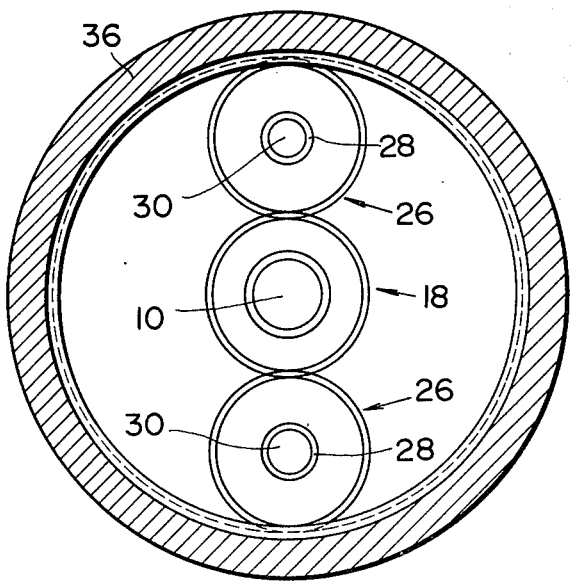
FIG. 4 is a sectional view taken along section line B—B of FIG. 3.

Turning now to the drawings and more specifically to FIGS. 3 and 4, a preferred embodiment of the present invention is shown. In this arrangement, a "high speed" shaft 10 is supported on a chassis 12 by a radical bearing 14 and a thrust bearing 15. The shaft 10 is formed at one end with a male screw thread 16 for threadably receiving a sun roller 18 thereon. The sun roller is of course formed with a corresponding female screw thread 20. The shaft 10 is also formed with an abutment flange 22 against which the sun roller is abutable. As shown, the sun roller 18 is formed with a truncated conical surface 24.

Planet rollers 26 are rotatably mounted on bearings 28 disposed on shafts 30 which are, in this case, fixedly connected to the chassis 12. The bearing arrangement is such that the planet rollers 26 are axially movable as well as rotatable. The planet rollers are each formed with truncated conical surfaces 32 and 34. The surfaces 32 are arranged to rollingly contact the conical surface 24 formed on the sun roller 18.

A ring roller 36 is formed at an inner periphery thereof with a truncated conical surface 38 which rollingly contacts the conical surfaces 34 of the planet rollers 26. The ring roller 36 has a boss 40 in which a threaded bore 42 is formed. The ring roller has a female screw thread 44 and is mounted on a "low speed" shaft 46 by a male thread 48. The so called "low speed" shaft, like the so called "high speed" shaft, is mounted on the chassis 12 by a thrust bearing 50 and a radial bearing 52. The shaft 46 is also formed with an abutment flange 54 against which the ring roller 36 will abut upon being fully screwed onto the male thread 48.

In this embodiment, it is preferred that the taper of each of the conical surfaces 24, 32, 34 and 38 be the same and lie between 5 and 30 degrees. The sun, planet and ring rollers may be formed of metal such as aluminium or hardened steel or from carbon or a suitable plastic.

In operation, if the input shaft is selected to be the "high speed" shaft and said shaft is arranged to rotate clockwise, it is necessary for all threads 16, 20, 44 and 48 to be left-hand threads. The reason for this is that, as the shaft 10 rotates, the sun roller 18, due to its own inertia and the resistance to rotation induced by the contact of the planet rollers thereon, will tend to unscrew from the shaft 10. Accordingly, the sun roller tends to advance along the shaft in turn pushing the planet rollers along the bearings 28 and toward the ring roller 36.

In this case, the male thread 48 formed on the end of the shaft 46 and the female thread 44 formed in the threaded bore 42 should both be left-hand threads so that, as the ring roller is rotated in the counter-clockwise direction indirectly by the clockwise rotation of the sun roller and the interposition of the planet rollers, the ring roller tends to rotate with respect to the shaft 46 until it firmly abuts the abutment flange 54. At this stage, the shaft 46 is rotated. Thereafter, the sun roller 18 will tend to advance along the thread 16 a little further until such time when the ring roller has abutted the abutment flange and has been biased against the planet rollers to produce a reaction which equals the tendency for the sun roller to unscrew. At this time, an adequate preloading between the sun, planet and ring rollers will have been established and any slippage between same prevented. With this arrangement, should the amount of torque inputted by the shaft 10 increase or decrease, the preloading between the sun, planet and ring elements will accordingly increase or decrease.

In the case that the roles of the sun roller and ring roller are reversed, that is to say the ring roller becomes the input element and the sun roller becomes the output element, the preloading arrangement will function by the ring roller's tending to unscrew along the thread 48 toward the sun roller. The planet rollers will be accordingly moved along the shafts 30 toward the sun roller which will be screwed back along the thread 16 until it abuts the abutment flange 22 and in turn produces a reaction which induces an equilibrium which prevents the ring roller from further advancement.

In the case that torque is to be transmitted in one direction only, viz., from the sun roller to the ring roller, then the ring roller may be advantageously fixed to the shaft 46 rather than threadably mounted thereon.

Where it is desired to employ a compound planetary gearing unit including two or more planetary units and/or a rotatable planet roller carrier, it is of course necessary to select the threads (viz., left- or right-hand) so as to achieve the desired effect. However, in light of the forgoing disclosure, this adaptation is deemed well within the grasp of one skilled in the art once given the knowledge of the instant invention.

What is claimed is:

1. Planetary gearing comprising:
   a first shaft and a sun roller threadably mounted on said first shaft, said sun roller tending to unscrew in a first axial direction along said first shaft when said first shaft is rotated in a first rotational direction;
   a second shaft and a ring roller threadably mounted on said second shaft, said ring roller tending to unscrew in a second axial direction along said second shaft when said ring roller is rotated in said first rotational direction; and
   planet roller shafts, planet rollers mounted on said planet roller shafts, and means for permitting said planet rollers to move in the axial direction of said planet roller shafts, said planet rollers being operatively interposed between and arranged to interconnect said sun roller and said ring roller, said ring roller rotating in a second rotational direction when said sun roller rotates in said first rotational direction.

2. Planetary gearing comprising:
   a first shaft and a sun roller threadably mounted on said first shaft, said sun roller tending to unscrew in a first axial direction along said first shaft when said first shaft is rotated in a first rotational direction;
   a second shaft and a ring roller mounted on said second shaft; and
   parallel planet roller shafts, said planet rollr shafts being spaced apart at fixed relative positions and distances, planet rollers rotatably mounted on said planet roller shafts, and means for permitting said planet rollers to move axially along said planet roller shafts, said planet rollers being operatively interposed between and arranged to interconnect said sun and ring rollers, said ring roller rotating in a second rotational direction when said sun roller rotates in said first rotational direction.

3. The planetary gearing of claim 2 wherein said ring roller is threadably mounted to said second shaft, said ring roller tending to unscrew in a second axial direction along said second shaft when said ring roller is rotated in said first rotational direction.

4. The planetary gearing of claim 2 wherein said sun roller has a first truncated conical surface, each said planet roller has a second and a third truncated conical surface, said second surface being inclined relative to said third surface, and said ring roller has a fourth truncated conical surface, said first and second conical surfaces rolling on each other, said third and fourth conical surfaces rolling on each other.

5. The planetary gearing of claim 4 wherein all said truncated conical surfaces have the same conical angle, said angle being between 5° and 30°.

6. The planetary gearing of claim 2 further including a chassis, thrust and radial bearings mounted on said chassis, and said first and second shafts mounted for rotation in said bearings.

7. The planetary gearing of claim 2 further including an abutment flange mounted on each of said first and second shafts, said sun roller abutting against said first shaft abutment flange, and said ring roller abutting against said second shaft abutment flange.

* * * * *